US012576941B2

(12) United States Patent
Van Druten

(10) Patent No.: US 12,576,941 B2
(45) Date of Patent: Mar. 17, 2026

(54) CONTROL DEVICE FOR A BICYCLE

(71) Applicant: Classified Cycling B.V., Antwerp (BE)

(72) Inventor: Roëll Marie Van Druten, Eindhoven (NL)

(73) Assignee: CLASSIFIED CYCLING B.V., Antwerp (BE)

( * ) Notice: Subject to any disclaimer, the term of this patent is extended or adjusted under 35 U.S.C. 154(b) by 20 days.

(21) Appl. No.: 18/551,804

(22) PCT Filed: Mar. 23, 2022

(86) PCT No.: PCT/EP2022/057683
§ 371 (c)(1),
(2) Date: Sep. 21, 2023

(87) PCT Pub. No.: WO2022/200460
PCT Pub. Date: Sep. 29, 2022

(65) Prior Publication Data
US 2024/0174318 A1 May 30, 2024

(30) Foreign Application Priority Data
Mar. 23, 2021 (NL) ...................................... 2027819

(51) Int. Cl.
*B62K 23/06* (2006.01)
*B62M 25/08* (2006.01)

(52) U.S. Cl.
CPC ............. *B62K 23/06* (2013.01); *B62M 25/08* (2013.01)

(58) Field of Classification Search
CPC ................................ B62K 23/06; B62M 25/08
See application file for complete search history.

(56) References Cited

U.S. PATENT DOCUMENTS

| 10,486,658 B2 | 11/2019 | Komatsu et al. |
| 10,889,346 B2 | 1/2021 | Kurokawa |

(Continued)

FOREIGN PATENT DOCUMENTS

| CH | 715402 A2 | 3/2020 |
| CN | 102730133 A | 10/2012 |

(Continued)

OTHER PUBLICATIONS

International Search Report dated Mar. 14, 2023, issued in corresponding International Application No. PCT/EP2022/057683 (6 pgs.).

(Continued)

*Primary Examiner* — Edwin A Young
(74) *Attorney, Agent, or Firm* — Pillsbury Winthrop Shaw Pittman, LLP

(57) ABSTRACT

The disclosure relates to a control device (60A, 60B) for a bicycle (1000), comprising a support body (2) for being fixed to a handlebar (33) of the bicycle (1000), a lever (3) movably arranged relative to the support body (2), and a sensing device arranged to transmit a signal upon actuation thereof. The lever (3) is movable relative to the support body (2) from a neutral position to a braking position for initiating a braking action, and from the neutral position to a first actuation position in which the lever (3) actuates the sensing device. The lever (3) is movable from the neutral position to the braking position in a first direction. The lever (3) is also movable from the neutral position to the first actuation position in a second direction different from the first direction.

22 Claims, 7 Drawing Sheets

| | | Lever position of second control device | | |
|---|---|---|---|---|
| | | Neutral position | 1st actuation position | 2nd actuation position |
| Lever position of first control device | Neutral position | 9th control program | 3rd control program | 4th control program |
| | 1st actuation position | 1st control program | 5th control program | 7th control program |
| | 2nd actuation position | 2nd control program | 6th control program | 8th control program |

(56)         References Cited

U.S. PATENT DOCUMENTS

| | | | |
|---|---|---|---|
| 2007/0137361 A1 | 6/2007 | Fujii | |
| 2014/0303857 A1* | 10/2014 | Takamoto | B62M 25/08 |
| | | | 701/51 |
| 2019/0031283 A1 | 1/2019 | Suzuki et al. | |
| 2019/0054968 A1* | 2/2019 | Kurokawa | B62J 1/08 |
| 2019/0061716 A1 | 2/2019 | Takahashi et al. | |
| 2019/0315423 A1 | 10/2019 | Usui et al. | |
| 2020/0180728 A1 | 6/2020 | Ohashi | |
| 2020/0207444 A1* | 7/2020 | Shahana | B62J 45/411 |
| 2020/0317289 A1* | 10/2020 | Honda | B62K 23/06 |
| 2020/0377167 A1 | 12/2020 | Suzuki et al. | |

FOREIGN PATENT DOCUMENTS

| | | | |
|---|---|---|---|
| DE | 202015103054 | U1 | 10/2015 |
| DE | 102006038225 | B4 | 3/2016 |
| DE | 102018115403 | A1 | 1/2019 |
| EP | 1473221 | A2 | 11/2004 |
| EP | 2492178 | B1 | 9/2014 |
| EP | 2873600 | A1 | 5/2015 |
| EP | 2682332 | B1 | 9/2015 |
| EP | 3239679 | A1 | 1/2017 |
| EP | 3680163 | A1 | 7/2020 |
| JP | 3206460 | U | 9/2016 |
| TW | 644831 | B | 12/2018 |
| WO | 2012/017096 | A1 | 2/2012 |
| WO | 2017/031069 | A1 | 2/2017 |

OTHER PUBLICATIONS

Written Opinion of International Searching Authority dated Mar. 14, 2023, issued in corresponding International Application No. PCT/EP2022/057683 (17 pgs.).

International Search Report dated Jul. 17, 2023, issued in corresponding International Application No. PCT/EP2022/087924 (9 pgs.).

International Search Report dated May 9, 2023, issued in corresponding International Application No. PCT/EP2022/087812 (8 pgs.).

Office Action dated Sep. 30, 2025, issued in corresponding EP Application No. 22717786.2 (9 pgs.).

* cited by examiner

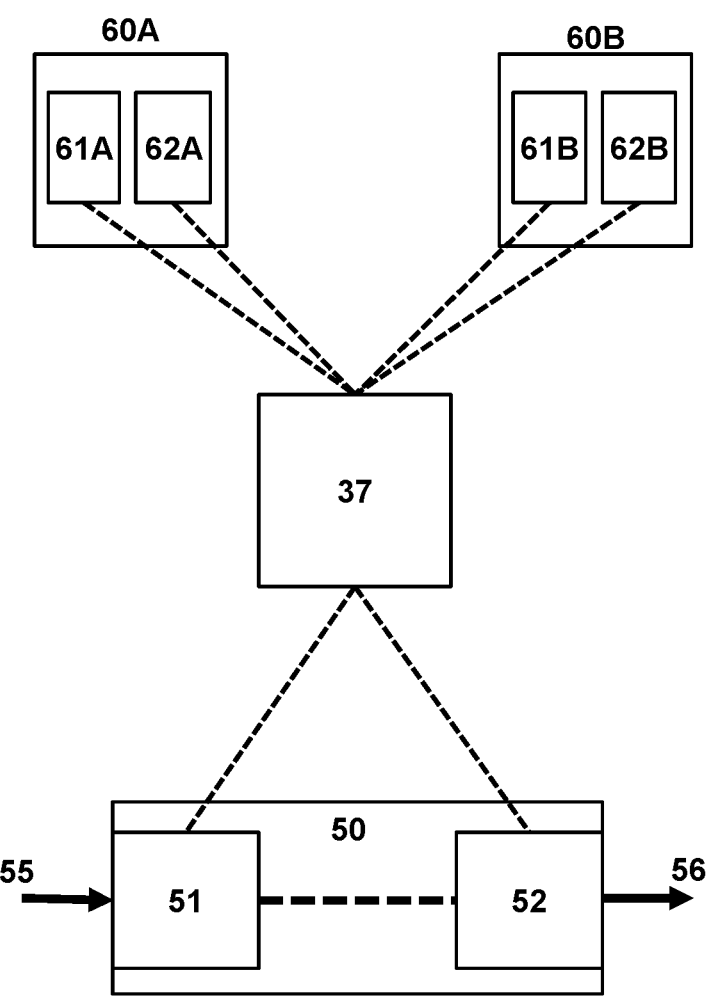
FIG 5

| | | Lever position of second control device | | |
|---|---|---|---|---|
| | | Neutral position | $1^{st}$ actuation position | $2^{nd}$ actuation position |
| Lever position of first control device | Neutral position | $9^{th}$ control program | $3^{rd}$ control program | $4^{th}$ control program |
| | $1^{st}$ actuation position | $1^{st}$ control program | $5^{th}$ control program | $7^{th}$ control program |
| | $2^{nd}$ actuation position | $2^{nd}$ control program | $6^{th}$ control program | $8^{th}$ control program |

FIG 6

CONTROL DEVICE FOR A BICYCLE

CROSS-REFERENCE TO RELATED APPLICATIONS

This application is the U.S. National Stage of PCT/EP2022/057683, filed Mar. 23, 2022, which claims priority to Netherlands Patent Application No. 2027819, filed Mar. 23, 2021, the contents of each of which are incorporated herein by reference in their entireties.

FIELD OF THE INVENTION

The invention relates to a control device for a bicycle.

BACKGROUND OF THE INVENTION

Bicycles, in particular racing bicycles, have a transmission system that traditionally includes a front derailleur and a rear derailleur, for shifting gears of the transmission system.

Control devices allows a cyclist to operate each of the derailleurs while cycling, for selecting an appropriate gear. The control devices are conveniently provided in reach of the cyclist, typically mounted at or near a grip portion of a handlebar of the bicycle, to facilitate the operation of the control device while cycling.

A control device conventionally comprises one or more shift levers which are manually operable by a user to effect a gearshift. Movement of one of the shift levers for example pulls a shift cable which connects to one of the derailleurs, causing a movement of the derailleur to shift a chain to a sprocket of a larger or smaller diameter.

Bicycles typically include two separate control devices; typically a right control device dedicated for operating the rear derailleur and a left control device for dedicated for controlling the front derailleur, or vice versa. The right control device is by convention operable by a right hand of the cyclist to operate the rear derailleur, whereas the left control device is operable by a left hand of the cyclist to operate the front derailleur.

Known control devices may also include, in addition to the shift lever, a brake lever for operating the brakes. Such control devices are often referred to as being integrated. The brake lever is manually operable by the cyclist to be moved in a brake direction for initiating a brake action. The one or more shift levers are also movable in a brake direction along with the brake lever, without initiating a gearshift. The brake lever typically takes along the one or more shift levers in the brake direction. A gearshift can be initiated by moving the one or more shift levers in a direction transverse to the brake direction.

Using the two traditional control devices for up- and downshifting separate transmission systems, such as a front- and rear derailleur can be cumbersome, as shifting with the front derailleur typically results in a large change in transmission ratio, which may need to be compensated for by also shifting the rear derailleur to obtain at a desired consecutive change in transmission ratio.

Furthermore, consecutive braking and gear shifting, or consecutive up- and downshifting with conventional control devices, can be inconvenient as it requires repositioning of the hand and/or fingers multiple times.

It is therefore an object to provide a control device that facilitates and improves the handling of the control device.

It is further an object to facilitate and improve the overall gear-shifting performance of the bicycle.

SUMMARY

In general, according to a first aspect, a control device for a bicycle is provided, comprising a support body for being fixed to or integrated with a handlebar of the bicycle, at least one manipulation organ movably arranged relative to the support body for being manually operable by a user, and a sensing device arranged to transmit a signal upon actuation thereof. At least one of the at least one manipulation organ is movable relative to the support body to a first actuation position in which the manipulation organ actuates the sensing device to transmit a first signal, and the same or another of the at least one manipulation organ is movable relative to the support body to a second actuation position in which the manipulation organ actuates the sensing device to transmit a second signal, different from the first signal. The first signal may trigger execution of a first control program, e.g. contained by a controller, and the second signal may trigger execution of a second control program, e.g. contained by the controller. The first signal and second signal may for example be shift signals, e.g. for respectively executing an upshift control program and a downshift control program. The manipulation organ may additionally be movable to a further actuation position, such as to a third actuation position, and/or fourth actuation position, etc.

The at least one manipulation organ may particularly include, e.g. be embodied as, for example, one or more of a push button, a switch, a rocker switch, a monostable switch, a slider, a rotary switch, and a lever.

The control device may be mounted to any bicycle handlebar, e.g. a drop-bar handlebar as typically used on road-racing bikes, or flat-bar handlebars as typically used on commuter bikes and mountain bikes. The manipulation organ can particularly be embodied as a lever.

Optionally, the at least one manipulation organ, e.g. lever, is biased in a neutral position. The neutral position may correspond to a position in which the manipulation organ, e.g. lever, does not actuate the sensing device and/or initiate the braking action. The manipulation organ, e.g. lever, may be biased in a direction opposite the first direction and/or opposite the second direction. A first elastic return member may for example be provided for returning the manipulation organ, e.g. lever, from the first actuation position and/or from a further actuation position, to the neutral position. Also, a second elastic return member may be provided for returning the manipulation organ, e.g. lever, from a brake position to the neutral position.

Optionally, the transmission of the first signal and the second signal are independently triggerable by means of movement of one manipulation organ. Thus, a single manipulation organ can be used for selectively generating the first or second signal.

Optionally, the transmission of the first signal is triggerable by moving the manipulation organ from the first actuation position to a neutral position. Optionally, the transmission of the second signal is triggerable by holding the manipulation organ in the first actuation position for a predefined period of time. Optionally, the transmission of the first signal is triggerable when the manipulation organ is at the first actuation position, or when the manipulation organ is moved to or away from the first actuation position, e.g. only in case the manipulation organ is moved from the neutral position directly to the first actuation position or vice versa. Optionally, the second signal is triggered by holding the manipulation organ in the second actuation position for a predefined period of time.

Optionally, the sensing device transmits the first signal when the manipulation organ is at the first actuation position or moves to or away from its first actuation position, and the second signal when the manipulation organ is at the second actuation position or moves to or away from the second actuation position.

Optionally, the manipulation organ is movable from the neutral position to the first actuating position and the second actuation position in an actuation direction. Optionally the manipulation organ is movable to the first actuation position by a moving the manipulation organ in the actuation direction by a first amount, and wherein the manipulation organ is movable to the second actuation position by a moving the manipulation organ in the actuation direction by a second amount different from the first amount.

Optionally, the sensing device is fixed to the manipulation organ, e.g. lever. The sensing device may for example be integrated in the manipulation organ, e.g. lever.

Optionally, the sensing device is fixed to the support body. The sensing device may for example be integrated in the support body. The sensing device may also be coupled to the intermediate body.

It will be appreciated that a first part of the sensing device may be fixed to the manipulation organ, e.g. lever, and a second part may be fixed to the support body, or that a first part of the sensing device may be fixed to the intermediate body and a second part may be fixed to the support body and/or manipulation organ, e.g. lever. For example, the sensing device may comprise a switch, e.g. an electronic switch, having a first part associated with the lever and/or intermediate body and a second part associated with the support body and/or intermediate body and/or manipulation organ, e.g. lever.

Optionally, the first signal and/or the second signal is a shift signal for initiating a gearshift. The shift signal is preferably an electronic signal, such as a wired electronic signal. The shift signal may be generated by means of an electronic switch, e.g. by opening or closing an electric circuit, and/or by providing a pulsed signal. The shift signal is can be transmitted to an actuator, e.g. using a wireless and/or wired connection. The shift signal is preferably transmitted to a controller arranged to process the shift signal, wherein the controller transmits a control signal, in response to the received shift signal, for activating an actuator, e.g. a shift actuator. The electronic switch opening or closing the electric circuit can also constitute the generating and transmitting of the shift signal.

Optionally, the sensing device is arranged to sense the manipulation organ, e.g. lever, being at the first actuation position and/or the second actuation position. The sensing device may be arranged to determine whether the manipulation organ, e.g. lever, is at the first actuation position or at the second actuation position. The sensing device may be arranged to sense the manipulation organ being at the neutral position.

Optionally, the sensing device comprises a first switch, and a second switch, and wherein the control device is arranged to actuate the first switch when the manipulation organ, e.g. lever, is at the first actuation position, and to actuate the second switch when the manipulation organ, e.g. lever, is at the second actuation position. The switch may be an electronic switch. Actuation of the first switch may open or close an electric circuit when the manipulation organ, e.g. lever, is at the first actuation position, or when the manipulation organ, e.g. lever, moves towards or away from the first actuation position. Similarly, actuation of the second switch may open or close a second electric circuit when the manipulation organ, e.g. lever, is at the second actuation position, or when the manipulation organ, e.g. lever, moves towards or away from the second actuation position. It will be appreciated that the sensing device may comprise a third switch, wherein the control device is arranged to actuate the third switch when the manipulation organ, e.g. lever, is at the neutral position. The third switch may open or close an electric circuit when the manipulation organ, e.g. lever, is at its neutral position.

Optionally, the control device comprises a controller operatively connected to the sensing device, the controller containing one or more control programs that are executable by actuation of the sensing device. The controller may be arranged to execute a control program dependent on the position of the manipulation organ, e.g. lever, and/or dependent a signal received from the sensing device. For example, the control device may be arranged to execute a first control program when the manipulation organ, e.g. lever, is at the first actuation position and/or when the manipulation organ, e.g. lever, moves towards or away from the first actuation position; and a second control program when the manipulation organ, e.g. lever, is at the second actuation position and/or when the manipulation organ, e.g. lever, moves towards or away from the second actuation position. A third control program may executable when the manipulation organ, e.g. lever, is at the neutral position.

The execution of a control program may also be depending on a current or previous state of the sensing device, control device and/or a transmission system. Hence, the control device may be arranged to allow the user to toggle between control programs, by means of a repeated actuation of the sensing device.

Further, the sensing device may include one or more actuation states, wherein each state associates to a different control program. For example, the sensing device may include a switch having a first actuation state associated with the manipulation organ, e.g. lever, being in its first actuation position, a second state associated with the manipulation organ, e.g. lever, being in its second actuation state, and/or a zeroth actuation state associated with the manipulation organ, e.g. lever, being in its neutral position.

The controller may also be connected to a sensor, such as a torque sensor, crank cadence sensor, speed sensor, pressure sensor, or other sensor, wherein the controller is arranged to execute a control program arranged dependent on a signal received from the sensor and/or the sensing device. The sensor(s) and/or sensing device(s) could be wiredly or wirelessly connected to the controller.

Optionally, the controller comprises, or is connected to, a transmitter or transceiver arranged for transmitting and/or receiving a wireless control signal. The transmitter may include an antenna for receiving a wireless signal. It will be appreciated that the transmitter may be considered to be part of the controller of the control device. The controller may communicate with an actuator or multiple actuators for example, by means of the transmitter. The controller may for instance transmit, with the transmitter, a control signal that is associated with an upshift command to an actuator, which actuator, in response to the control signal, brings about an upward gearshift. The controller may transmit multiple control signals to multiple actuators simultaneously and/or sequentially, e.g. in response to a single signal received from the sensing device. The control signal is preferably transmitted by the transmitter wirelessly, but it will be appreciated that the control signal can also be transmitted by wire.

Optionally, each of the control programs is customizable. Hence, a user may set or adapt the functionality of the control device according to his/her wishes. For instance, the user may program the control unit to include a first control program for activating a gearshift, and a second control program for controlling a suspension system, wherein the first control program is for example executable upon moving the manipulation organ, e.g. lever, to the first actuation position and the second control program is executable upon moving the manipulation organ, e.g. lever, to the second actuation position. It will be appreciated that the control programs need not be limited to gear-shifting. For example, the control device may include a control program for controlling various bicycle actuators, such as a seat-post adjustment actuator, electric propulsion systems, and other electronic devices such as a bicycle computer and lighting devices, direction indicator devices, sound devices, or the like.

Optionally, the controller contains a control program executing a gearshift of a bicycle transmission.

Optionally, the controller is arranged to execute a first control program when the manipulation organ, e.g. lever, is at the first actuation position, and a second control program when the manipulation organ, e.g. lever, is at the second actuation position. The execution of a control program may also be dependent on a current or previous state of the control device and/or transmission system. For example the first control program may be executed when the manipulation organ, e.g. lever, departs from, e.g. moves away from, the first actuation position (e.g. towards neutral position). Also the second control program may for example be executed when the manipulation organ, e.g. lever, is in the second actuation position, or departs from, e.g. moves away from, the second actuation position.

It is preferred that each control program is independently triggerable. It may for example be desired that the first control program is not executed in case the manipulation organ, e.g. lever, moves from its neutral position to its second actuation position via its first actuation position. The initiation of a control program may for example be made dependent on an actuation time, i.e. the time duration the sensing device is actuated. For example, the sensing device may be arranged to detect a time duration the manipulation organ, e.g. lever, is maintained at a particular actuation position. The controller may be accordingly be arranged to execute or not execute a control program dependent on said detected time.

It may also be desired that the first control program is not executed in case the manipulation organ, e.g. lever, returns to its neutral position from its second actuation position via its first actuation position. For example, the controller may be arranged to not execute the first control program in a time period after the execution of the second control program has been triggered. Also, the controller may be arranged to not execute the first control program in case the second control program has been executed prior to triggering of the first control program and the manipulation organ, e.g. lever, has not been returned to its neutral position after triggering the second control program. The control device may thus be arranged to only execute, with the controller, two consecutive control programs, in case the manipulation organ, e.g. lever, has been returned to its neutral position intermediate the execution of said consecutive control programs. Also, the control device may be arranged to execute a control program, with the controller, in case the manipulation organ, e.g. lever, has been maintained a predefined time period at an associated actuation position.

The sensing device may also be arranged to detect a travel direction of the manipulation organ, e.g. lever. The travel direction of the manipulation organ, e.g. lever, may be mechanically and/or electronically determined. The manipulation organ, e.g. lever, may for example change or not change a state of the sensing device, wherein the state change is dependent on a travel direction of the manipulation organ, e.g. lever. Moving the manipulation organ, e.g. lever, from the neutral position to the first actuation position, may for example change the state of the sensing device e.g. from a zeroth state to first state, whereas moving the manipulation organ, e.g. lever, from its second actuation position, e.g. corresponding to the actuation device being in a second actuation state, to the first actuation position may not change the state of the sensing device. It is preferred that the returning the manipulation organ, e.g. lever, to the neutral position, irrespective of its travel direction, may bring the state of the sensing device to the neutral actuation state, e.g. a zeroth state. For example, moving the manipulation organ, e.g. lever, from its second actuation position to its neutral position, e.g. via the first sensing device, may change the state of the sensing device from the second state to the zeroth state, preferably without intermediately changing the actuation state to the first actuation state. Similarly, moving the manipulation organ, e.g. lever, from the first actuation position to the neutral position may change the state of the sensing device from the first actuation state to the zeroth actuation state.

Optionally, the first control program and/or the second control program activate(s) a gearshift of a bicycle transmission. Multiple actuators may be involved to change a current overall ratio of the transmission system, to a desired transmission ratio.

Optionally, the first control program activates an upward gearshift and the second control program activates a downward gearshift, or vice versa.

Optionally, the first control program activates a gearshift to the first next higher transmission ratio, and the second control program activates a gearshift to the first next lower transmission ratio, or vice versa. Hence, the cyclist only needs to command an upshift or downshift, e.g. by means of moving the manipulation organ, e.g. lever, to the first or second actuation position. The controller then controls one or more shift actuators of the transmission system in response to the upshift or downshift command provided by the cyclist. Depending on the transmission ratio used at that point in time, the next higher transmission ratio can be obtained by actuating one or more shift actuators. The controller may be configured to select and actuate the appropriate shift actuator. For example, a gearshift to the next higher transmission ration may involve a gearshift with e.g. a front derailleur as well as with e.g. a rear derailleur, whereas the user needs to make only one gearshift command, as the controller activates both the derailleurs accordingly. Shifting is thus simplified for the user. It will be appreciated that instead or in addition to derailleurs, also other shift devices or transmissions may be present in the transmission system of the bicycle.

Optionally, the one or more shift actuators are arranged for being operated electronically by the controller. The transmission system can be arranged such that the transmission ratios through which can be shifted can be chosen or adapted by the user.

Optionally, the first control program executes a gearshift to the first next higher or lower transmission ratio, and the second control program executes a gearshift to the second, third, fourth, fifth or sixth next higher or lower transmission ratio. Hence, the second control program activates a change of the transmission ratio of the transmission system with a larger step than the first control program. Such large step, sometimes called a bail-out, allows for a quick increase or decrease of the transmission ratio. Similar to the first control program, the cyclist only needs to command one (bail out) upshift or downshift according to the second control program, e.g. by moving the manipulation organ, e.g. lever, to the second actuation position. The controller then controls the one or more shift actuators of the transmission system accordingly. The second control program may be customizable, to allow a user to choose a desired bail out step. The bail out step may for example be the second, third, fourth, fifth, sixth, seventh, eighth or ninth next higher or lower transmission ratio.

In a particular example, the manipulation organ is embodied as a lever. In a particular example, the manipulation organ is embodied as a rotary switch, e.g. a unidirectional rotary switch arranged to be manually rotated in a single direction about a rotation axis, or a bi-directional rotary switch arranged to be manually rotated in two opposite directions about the rotation axis. The rotation axis may for example coincide with or be parallel with an axis in which the handlebar extends. The rotary switch may be an endless rotary switch, having no rotation end points. The endless rotatory switch, either unidirectional or bidirectional, may hence be rotated infinitely. The rotary switch may alternatively be rotatable between end points, e.g. with or without a return to neutral. The rotary switch can include a ring shaped body, e.g. surrounding a handlebar. Further, the actuation positions of the manipulation organ may be indexed, wherein each indexed position is associated with an actuation position, or non-indexed.

More particular, may be provided a control device for a bicycle, comprising a support body for being fixed to a handlebar of the bicycle, a manipulation organ, such as a lever, movably arranged relative to the support body, and a sensing device arranged to transmit a signal upon actuation thereof. The manipulation organ, e.g. lever, can be movable relative to the support body in a first direction to a braking position for initiating a braking action, and in a second direction to a first actuation position in which the lever actuates the sensing device. The second direction is different from the first direction. The manipulation organ according to this aspect, e.g. lever, may further be movable relative to the support body to a second actuation position in which the manipulation organ actuates the sensing device to transmit a second signal, different from the first signal. The manipulation organ may be movable in the second direction to the second actuation position.

In view of the above aspects also the following can apply.

The manipulation organ, e.g. lever, may be movable in the first direction, e.g. a brake direction, from a neutral position, in which the manipulation organ, e.g. lever, does not initiate a braking action, to the braking position in which braking action is applied. The manipulation organ, e.g. lever, may be movable in the first direction from the first actuation position to the braking position.

The manipulation organ, e.g. lever, may be movable in the second direction, e.g. an actuation direction, from a neutral position, e.g. a position in which the manipulation organ, e.g. lever does not actuate the sensing device, to the first or a further actuation position. It will be appreciated that the neutral position of the manipulation organ, e.g. lever in respect of the second direction may coincide with the neutral position in respect of the first direction, the braking position of the lever, and/or any position therebetween.

Similarly, the manipulation organ, e.g. lever, may be movable in the second direction from a neutral position, e.g. a position in which the lever does not initiate the braking action, to the braking position. It will be appreciated that the neutral position of the manipulation organ, e.g. lever, in respect of the first direction may coincide with the neutral position in respect of the second direction, the braking position of the manipulation organ, e.g. lever, and/or any position therebetween.

Optionally, the manipulation organ, e.g. lever, is movable, e.g. in the second direction, from the neutral position to a second actuation position, different from the first actuation position, in which the manipulation organ, e.g. lever, actuates the sensing device, and wherein the sensing device transmits a first signal when the manipulation organ, e.g. lever, is at the first actuation position, and a different second electronic signal when the manipulation organ, e.g. lever, is at the second actuation position. This greatly increases the functionality of the manipulation organ, e.g. lever, compared to a manipulation organ, e.g. lever, having only one actuation position. It will be appreciated that the second position need not be reachable by moving the manipulation organ, e.g. lever, in the second direction. The manipulation organ, e.g. lever, may for example be movable in third direction, different from the second direction, from the neutral position to the second actuation position. For example, the first actuation position and the second actuation position may be at opposite sides of the neutral position. This way, the second direction and third direction are opposite one another. It is however preferred that the manipulation organ, e.g. lever, is movable from the neutral position to a second actuation position in the second direction. This provides an intuitive setup, that is easy to use during cycling.

Optionally, the manipulation organ, e.g. lever, is movable to the first actuation position by moving the manipulation organ, e.g. lever, in the second direction by a first amount, and wherein the manipulation organ, e.g. lever, is movable to the second actuation position by a moving the manipulation organ, e.g. lever, in the second direction by a second amount. The first amount and the second amount may be defined a travel distance from a neutral position to respectively the first actuation position and the second actuation position. The second amount may be larger or smaller than the first amount. Preferably, the second amount is larger than the first amount. The second actuation position may be reachable via the first actuation position, i.e. by moving the manipulation organ, e.g. lever, through and beyond the first actuation position. For example, the manipulation organ, e.g. lever, may be moved from the neutral position to the first actuation position, and subsequently from the first actuation position to the second actuation position. A biasing member may return the manipulation organ, e.g. lever, in a reverse direction, i.e. from the second actuation position to the neutral position, e.g. via the first actuation position, when the manipulation organ, e.g. lever, is released after actuation.

The manipulation organ, e.g. lever, may include multiple neutral positions. It is however preferred that the control device includes only one neutral position. The neutral position in respect of the first direction may thus correspond to the neutral position in respect of the second direction. The manipulation organ may be biased into the neutral position(s).

The manipulation organ, e.g. lever, may particularly be a single manipulation organ, e.g. a single lever. The control device may for example comprise only one lever or only one rotary switch. The control device may comprise no other levers or switches. The single manipulation organ, e.g. the single lever, may accordingly be arranged for initiating a braking action as well as a gear shift. Hence, no dedicated shift lever and dedicated brake lever are required. The lever may be manually operably by a user.

The sensing device may be arranged to detect a position, e.g. an orientation, of the manipulation organ, e.g. lever, e.g. relative to the support body. The sensing device may include one or more switches, detectors, sensors, and/or other means for detecting a position of the manipulation organ, e.g. lever. The sensing device may be arranged to detect multiple distinct positions of the manipulation organ, e.g. lever, e.g. relative to the support body, each distinct position e.g. corresponding to a different actuation position. The sensing device may for example include one or more actuation states, wherein the control device is arranged to change the actuation state of the sensing device by means of the manipulation organ, e.g. lever. Each actuation state of the sensing device may be associated with a control program that is executable by a controller being operatively connected with the sensing device.

In particular, the sensing device may be arranged to detect a position of the manipulation organ, e.g. lever, in the second direction, e.g. the actuation direction. The sensing device may also be arranged to detect a position of the manipulation organ, e.g. lever, in the first direction, e.g. for regulating a magnitude of the braking action. It will be appreciated that the sensing device may be arranged to detect the manipulation organ, e.g. lever, being in a neutral position, e.g. the manipulation organ, e.g. lever, may actuate the sensing device while in its neutral position.

In addition to the first actuation position, the manipulation organ, e.g. lever, may be movable to a further actuation position, different from the first actuation position, wherein the manipulation organ, e.g. lever, also actuates the sensing device in the further actuation position.

It will be appreciated that actuation of the sensing device may involve opening and/or closing of an electric circuit. For example, the sensing device can be actuated upon arrival of the manipulation organ, e.g. lever, at the first (or a further) actuation position. It is also possible that the sensing device is actuated upon departure of the manipulation organ, e.g. lever, from the first (or a further) actuation position. It is furthermore possible that the sensing device is actuated by the manipulation organ, e.g. lever, upon arrival at and/or upon departure from the neutral position. The actuation of the sensing device may trigger the transmission of a signal, e.g. an electric or electronic signal. This signal may be received by a controller, actuator or other device.

The manipulation organ, e.g. lever, may initiate a brake action of, e.g. a hydraulic rim or disc brake of the bicycle. Movement of the lever in the first direction may for instance actuate a hydraulic cylinder or electric switch of a brake system. A hydraulic cylinder may for example be held by the lever or support device. The manipulation organ, e.g. lever, may also activate, e.g. electronically, an electric generator to effect a braking action, when the manipulation organ, e.g. lever, is in the brake position. This recovers energy from the deceleration of the bicycle.

The first direction and the second direction may be 180 degrees apart. It is however preferred that the first direction and the second direction are not 180 degrees apart. It is in particular preferred that the first direction and the second direction are substantially perpendicular to one another, i.e. about 90 degrees apart. This way, the first and second direction are sufficiently separated from each other to limit unintentional initiation of a gear shift when initiating a brake action, or vice versa.

Optionally, the lever is pivotably connected to the support body. The support body can be concentric to the handle bar. The lever defines a lever arm that eases the movement of the lever.

Optionally, the lever is pivotable relative to the support body about a first pivot axis to pivot in the first direction, and the lever is further pivotable about a second pivot axis to pivot in the second direction. The first direction may, in use, be parallel to a longitudinal direction of the bicycle, e.g. opposite an intended forward travel direction of the bicycle. Hence, the movement of the lever in the first direction and the second direction may be a pivotal motion about the respective first and second pivot axis.

Optionally, the first pivot axis and the second pivot axis are substantially perpendicular to one another. This limits unintentional initiation of a gear shift when initiating a brake action, or vice versa.

Optionally, the first and second pivot axes are offset with respect to one another. This allows the pivot motion in the first direction to be different from the pivot motion in the second direction.

Optionally, the first and second pivot axes intersect at an intersection point, wherein, at the intersection point, a ball joint is provided for allowing the lever to pivot in the first direction and the second direction.

Optionally, an intermediate body is provided between the lever and the support body. The intermediate body may be movable relative to the support body in the first and/or second direction. The lever may be movable relative to the intermediate body in the first and/or second direction.

Optionally, the control device comprises blocking means arranged for blocking a movement of the lever in the second direction when the lever is moved in the first direction. This prevents the user from unintentionally changing the transmission ratio of the bicycle, when initiating a brake action by moving the lever in the first direction.

Optionally, the lever is movable in the first direction along a path, and wherein the blocking means are arranged to block the movement of the lever at a predefined section of the path. The blocking means may for example be arranged to block a movement of the lever in the first direction from the first or a further actuation position to the braking position. Also, the blocking means may for example be arranged to block a movement of the lever in the second direction from the braking position to the first or a further actuation position. For example, the blocking means may block a movement of the lever in the second direction in an initial path section corresponding to a moderate brake action, while allowing a movement in the second direction in a terminal path section corresponding to a substantial brake action. Alternatively, the blocking means may block a movement of the lever in the second direction in a terminal path section corresponding to a substantial brake action, while allowing a movement in the second direction in an initial path section corresponding to a moderate brake action.

According to a second aspect is provided a control system comprising a first control device and a second control device. The first control device is arranged to transmit a first signal when actuated according to a first mode and to transmit a second signal, different from the first signal, when actuated according to a second mode. The second control device is arranged to transmit a third signal when actuated according to a first mode and to transmit a forth signal, different from the third signal, when actuated according to a second mode. The control system comprises a controller that is operatively connected to the first and second control devices, the controller containing one or more control programs that are executable upon receiving of one or more of the first, second, third and fourth signals.

The first control device can comprise a support body for being fixed to or integrated with a handlebar of the bicycle and a manipulation organ arranged to be selectively brought into a first actuation position or a second actuation position. The first control device can be arranged to transmit the first signal when the manipulation organ actuated is in, reaches or leaves the first actuation position and to transmit the second signal when the manipulation organ actuated is in, reaches or leaves the second actuation position. The second control device can comprise a support body for being fixed to or integrated with a handlebar of the bicycle and a manipulation organ arranged to be selectively brought into a first actuation position or a second actuation position. The second control device can be arranged to transmit the third signal when the manipulation organ actuated is in, reaches or leaves the first actuation position and to transmit the fourth signal when the manipulation organ actuated is in, reaches or leaves the second actuation position.

The first control device and/or the second control device can be a control device according to the first aspect.

Hence, can be provided a control system, comprising a first control device according to the first aspect and a second control device according to the first aspect. The control system comprises a controller that is operatively connected to the sensing devices of the first and second control devices, the controller containing one or more control programs that are executable upon actuation of one or more of the sensing devices. It will be appreciated that the controller may be a controller as described in relation to the first aspect. The first and second control devices may be operated by a respective right and left hand of a user. For example, the first control device may be mounted at or near a right grip portion of a bicycle handlebar, and the second control device may be mounted at or near a left grip portion of the bicycle handlebar.

Both control devices may include the same or a different type of manipulation organ. For example, the first control device may include a lever, whereas the second control device includes a rotary switch, or vice versa.

Each manipulation organ, e.g. lever, of the first control device and the second control device is movable to an actuation position in which it actuates a sensing device. Different relative manipulation organ, e.g. lever, positions between the first control device and the second control device are possible. The different relative manipulation organ, e.g. lever, positions may be used to execute different control programs with the controller.

Optionally, the controller is arranged to execute a first control program when the manipulation organ, e.g. lever, of the first control device is at its first actuation position or moves away from its first actuation position, and the manipulation organ, e.g. lever, of the second control device is in its neutral position.

Optionally, the first control program activates a gearshift to the first next higher transmission ratio.

Optionally, the controller is arranged to execute a second control program when the manipulation organ, e.g. lever, of the first control device is at its second actuation position or moves away from its second actuation position and the manipulation organ, e.g. lever, of the second control device is in its neutral position.

Optionally, the second control program activates a gearshift to the second, third, fourth, fifth or sixth next higher transmission ratio.

Optionally, the controller is arranged to execute a third control program when the manipulation organ, e.g. lever, of the second control device is at its first actuation position or moves away from its first actuation position and the manipulation organ, e.g. lever, of the first control device is in its neutral position.

Optionally, the third control program activates a gearshift to the first next lower transmission ratio.

Optionally, the controller is arranged to execute a fourth control program when the manipulation organ, e.g. lever, of the second control device is at its second actuation position or moves away from its second actuation position and the manipulation organ, e.g. lever, of the first control device is in its neutral position.

Optionally, the fourth control program activates a gearshift to the second, third, fourth, fifth or sixth next lower transmission ratio.

Optionally, the controller is arranged to execute a fifth control program when both the manipulation organ, e.g. lever, of the first control device and the manipulation organ, e.g. lever, of the second control device are in their respective first actuation position or moves away from its first actuation positions.

Optionally, the controller is arranged to execute a sixth control program when the manipulation organ, e.g. lever, of the first control device is at its second actuation position or moves away from its second actuation position and the manipulation organ, e.g. lever, of the second control device is at its first actuation position.

Optionally, the controller is arranged to execute a seventh control program when the manipulation organ, e.g. lever, of the first control device is at its first actuation position or moves away from its first actuation position and the manipulation organ, e.g. lever, of the second control device is at its second actuation position.

Optionally, the controller is arranged to execute a eighth control program when both the manipulation organ, e.g. lever, of the first control device and the manipulation organ, e.g. lever, of the second control device are in their respective second actuation position or moves away from their second actuation positions.

Optionally, the controller is arranged to execute a ninth control program when both the manipulation organ, e.g. lever, of the first control device and the manipulation organ, e.g. lever, of the second control device are in their respective neutral position. To enable a user to independently select between the any of the control program, the initiation of a control program may be made dependent on the actuation time, i.e. the time duration the sensing device is actuated. For example, the sensing device may be arranged to detect a time duration one or more of the manipulation organ, e.g. levers are maintained at a particular actuation position. The controller may be accordingly arranged to execute or not execute a control program dependent on said detected time.

Further, the sensing device may include one or more actuation states, wherein each state associates to a different control program. The execution of a control program may be depending on a current or previous state of the control device and/or transmission system. For example the first control program may be executed when the manipulation organ, e.g. lever, moves away from the first actuation position (e.g. towards neutral position).

A third aspect provides a transmission system for a bicycle, comprising a control device as described herein, or a control system as described herein. The transmission system is a transmission arranged between a system input and a system output which transmission is operable according to multiple system transmission ratios. The transmission includes a first transmission which is operable according to a first transmission ratio and at least a second transmission ratio, and a first actuator for switching from the first to the at least second transmission ratio, or vice versa. The first or second transmission ratio can be a 1:1 coupling. The transmission also includes a second transmission operable according to a first transmission ratio and at least a second transmission ratio and a second actuator for switching from the first to the at least second transmission ratio, or vice versa. The first and second transmissions are couplable to each other, for example using an axle, shaft, chain, clutch or other suitable device. The first and second transmissions can be coupled in parallel and/or in series. The transmission system comprises a controller operatively connected to the one or more of the sensing devices of the one or more control devices. The controller is configured to control the first actuator and/or the second actuator upon receiving a signal from the one or more sensing devices. It will be appreciated that the controller can be a controller as described in relation to the first and second aspect.

Optionally, the first transmission and/or the second transmission comprises a continuously variable transmission that is used to switch, or shift, from the first to the second transmission ratio or vice-versa. While switching from the first to the second transmission ratio or vice-versa, the continuously variable transmission can traverse all (continuous) intermediate transmission ratios. The continuously variable transmission can also be used to switch from the first to a second and to a third transmission ratio or vice-versa. A change in transmission ratio of the continuous variable transmission may be dependent on a time duration of actuation of the sensing arrangement. For example, a short actuation duration of the sensing arrangement activates to a small transmission ratio change, whereas a long actuation duration of the sensing arrangement activates a large transmission ratio change. The continuous variable transmission may also be arranged to operate according to a discrete transmission. For example, the continuous transmission may be preprogrammed to operate in a discrete manner according to the first transmission ratio and the second transmission ratio, and optionally further transmission ratios. The transmission ratios of the continuous variable transmission may be adapted and/or customized by a user, e.g. using a communication device such as smart phone table or (bicycle)computer.

The first and the second, and possibly the third, transmission ratio can be chosen by the controller and possibly preprogrammed by the user. The user can e.g. select desired transmission ratios and set these in the controller, e.g. by creating a control program. Thereto, the controller can be operatively connected, or include, a user interface. The user interface may be part of a bicycle computer. The bicycle computer may be a releasably coupled to the handlebar. The user interface may be powered by the same power source, e.g. battery module, as the control device and other electric components. The user interface may also show the battery status of the battery module. It is also possible that the transmission ratios are selected on a communications device, such as a smartphone or tablet, and communicated to the controller. A computer program product, such as an app, can thereto be executed on the communications device.

The transmission ratio(s) can be chosen by the controller and can be adapted depending on the sprocket that is engaged with the chain. It is also possible that the user preprograms transmission ratios depending on the sprocket that can be engaged with the chain.

Optionally, the transmission unit has an input coupled to the set of sprockets and an output arranged to be coupled to a wheel. Alternatively, the transmission unit can have an input coupled to the system input and an output arranged to be coupled to the chain ring.

The system transmission ratio is defined by the first and second transmissions, in particular by the respective transmission ratios of the first and second transmissions. The first transmission ratio of the first transmission need not be identical to the first transmission ratio of the second transmission.

The transmission system, particularly the first transmission and/or the second transmission thereof, may include a set of sprockets, having varying numbers of teeth, such as a cassette. The number of teeth of the sprockets may increase from one sprocket to the next in a geometric order. The transmission system can include a chain driven by a chain ring and transferring torque from a system input, such as a crank, to one of the sprockets. The transmission system, particularly the first transmission and/or second transmission thereof, may include a planetary gear set.

The first actuator and/or the second actuator can be an electric actuator, derailleur system or a clutch or brake device.

Optionally, the controller is configured to selectively control the first and/or second actuator for switching the system transmission ratio to the first next higher or lower system transmission ratio upon receiving the signal.

Optionally, the controller is configured to selectively control the first and/or second actuator for switching the system transmission ratio to the second, third, fourth, fifth, or sixth next higher or lower system transmission ratio upon receiving the signal.

Optionally, the first next, second next, third next, fourth next, fifth next or sixth next higher or lower system transmission ratio can be chosen or adapted by the user.

A fourth aspect relates to an assembly, comprising a bicycle handlebar including a grip portion for allowing a user to grip the handle bar, and a control device in accordance with the first aspect, wherein the control device is mounted to the handlebar at or near the grip portion.

The fourth aspect also relates to an assembly comprising a bicycle handlebar including left and right grip portion for allowing a user to grip the handle bar with its respective a left and right hand, and a control system in accordance with the second aspect, wherein the first control device is mounted to the handlebar at or near the right grip portion and the second control device is mounted to the handlebar at or near the left grip portion.

Optionally, the controller is fixable to or integratable or integrated in the bicycle handlebar or in at least one of the first or second transmission.

Optionally, the sensing device of the left control device and the sensing device of the right control device are connected to a single controller. For example, the controller may be a centralized controller, e.g. having a housing that includes essentially all controller electronics.

Optionally, the sensing device of the left control device and the sensing device of the right control device are connected to an e.g. single, transmitter. The transmitter may be part of the controller. The transmitter may for example be provided within the controller housing.

Optionally, the sensing device of the left control device and the sensing device of the right control device are connected to a single battery. For example, the bicycle may contain only one battery.

Optionally the support body of the first control device and or the second control device are fixable or integratable or integrated in the bicycle handlebar.

Optionally, the assembly comprises a power source connected or connectable to the controller and/or the control device and/or the first actuator and/or the second actuator.

Optionally, the power source is a single battery or battery module. The battery module may be exchangeably held by the frame or handlebar of the bicycle. The battery module may for example be held in a cavity of the handlebar of the bicycle. The control device may be powered by propulsion battery of the an electric propulsion system of the bicycle.

Optionally, the power source is fixable to or integratable or integrated in the handlebar.

A fifth aspect relates to a bicycle comprising a control device according to the first aspect, a control system according to the second aspect, a transmission system according to the third aspect, or an assembly according to the fourth aspect. It will be appreciated that a bicycle, as referred to herein, is not limited to a two-wheeled vehicle. A bicycle may contain one, two, three, four wheels or more. A bicycle may fully or partly human powered, and may comprise an automatic propulsion system, e.g. comprising an electric motor.

It will be appreciated that any one or more of the above aspects, features and options can be combined. It will be appreciated that any one of the options described in view of one of the aspects can be applied equally to any of the other aspects. It will also be clear that all aspects, features and options described in view of the control device apply equally to the control system. It will also be clear that all aspects, features and options described in view of the control device and control system apply equally to the transmission system, assembly, and bicycle.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 5 shows a schematic representation of a transmission system;

FIG. 6 shows a schematic representation of a manipulation organ dependent execution of control programs by a controller

DETAILED DESCRIPTION

Figures 1A, 1B, 1C:
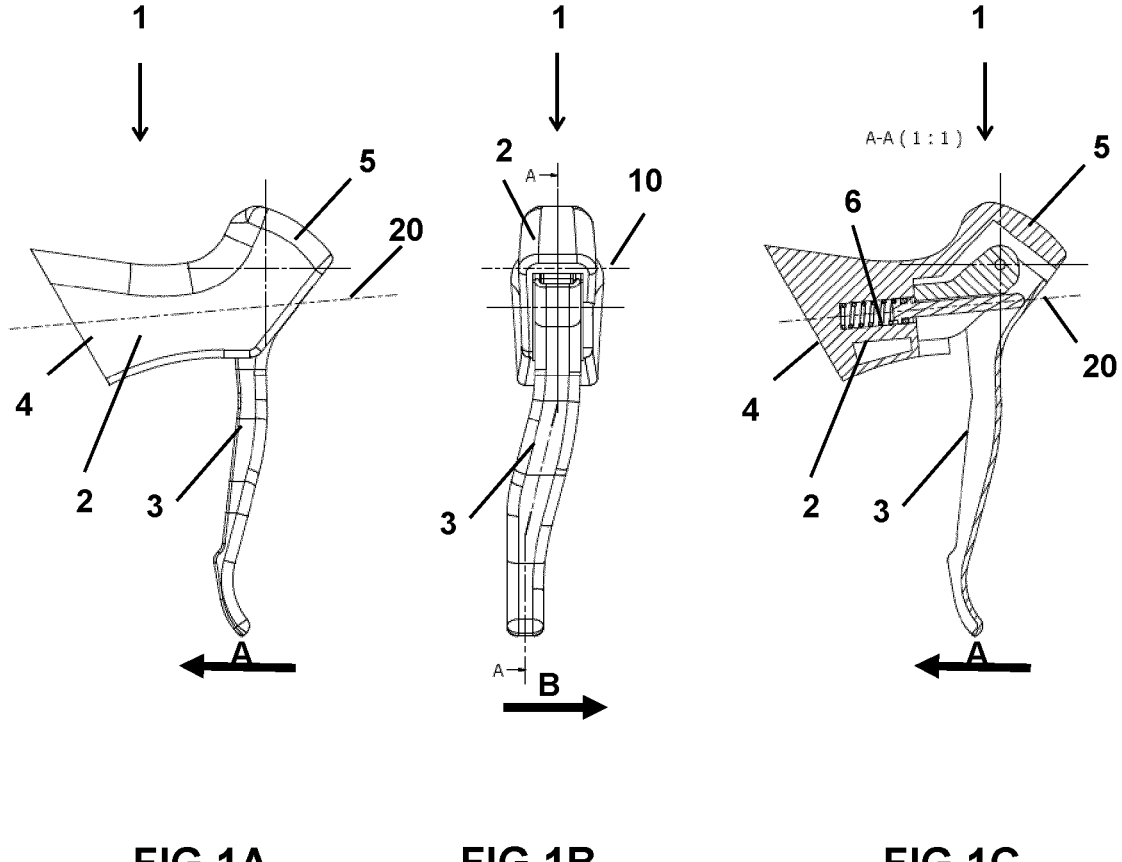
FIGS. 1A-1C show an example of a control device.

FIGS. 1A-1C shows respective views of a control device 1. FIG. 1A shows a side view, FIG. 1B a frontal view, and FIG. 1C a cross-sectional vies of the control device. The control device 1 comprises a support body 2 and at least one manipulation organ 3. In the examples, the control device comprises a single manipulation organ. In the examples, the manipulation organ is embodied as a lever 3. The control device 1 can be mounted to a handlebar of a bicycle. For example, the support body 2 can at a proximal end 4 thereof, be attached to the handlebar. In this example, the control device is suitable for attachment to a drop handlebar, typically used for road and gravel racing bikes, but it will be appreciated that the control device 1 described herein can also be used in combination with other handlebars. The support body 2 extends from the proximal end to a distal end 5, and defines a grip portion for a cyclist. The lever 3 is movably, in particular, pivotally connected to the support body 2, near the distal end 5 of the support body 5. The cyclist can manually move the lever 3 relative to the support body 2. In this example, the support body 2 is particularly shaped to provide a support surface for a palm of the cyclist's hand, such that the cyclist is able to operate the lever 3 with its fingers. In this example, the lever extends from near the distal end 5 of the support body 2 in a direction substantially transverse to the extension direction of the support body 2. This allows the cyclist to reach the lever with its fingers, also when its hands are positioned in the drops of the drop handlebar.

The lever 3 is pivotable relative to the support body about a first pivot axis 10, allowing the lever 3 to be moved in a first direction. In the configuration shown in FIGS. 1A-1C, the lever 3 is in its neutral position. The first direction, in this example, is indicated by arrow A, corresponding to an inward motion of the lever 3 from the neutral position in respect of the first direction. It will be appreciated that the lever may alternatively, or additionally, move in a non-pivoting way in the first direction, for example translationally. In this case, the lever 3 pivots about the first pivot axis 10 within a first plane. The cyclist can e.g. initiate a braking action by moving the lever 3 in the first direction. A biasing member, here a return spring 6 is arranged to bias the lever in a direction opposite the first direction, i.e. towards the neutral position. This way the lever automatically returns to its neutral position after release of the lever 3.

The lever is in this example further pivotable relative to the support body about a second pivot axis 20, in a second direction. The second direction is indicated by arrow B. The second direction, in this example, is transverse to the first direction. It will be appreciated that the second direction may be any direction other than the first direction. Here, the first pivot axis 10 is transverse to the second pivot axis 20. The lever 3 is movable in the second direction at least from a neutral position in respect of the second direction to a first actuation position. The neutral position in respect of the second direction may include the brake position and any position between the brake position and the neutral position in respect of the first direction. The lever 3 is here for example pivotable from a brake position of the lever 3. The lever 3 may similarly be movable in the first direction from the first actuation position or from a further actuation position.

Here, the control device comprises only one lever 3. With this single lever 3, the cyclist can operate the brakes of the bicycle by moving the lever in the first direction, and operate any other device, particularly shifting actuators for effecting a gearshift, by moving the lever in the second direction. There is no dedicated shift lever and brake lever required.

A biasing member is provided, for returning the lever 3 from the first actuation position to the neutral position after being released. The control device 1 may comprise blocking means for preventing the lever 3 from being moved in both the first direction and the second direction. The blocking means may for example comprise a guide body for selectively guiding the lever 3 in either the first direction or the second direction.

The control device further comprises a sensing device. The sensing device is arranged to detect the position of the lever 3, e.g. relative to the support body 2. The sensing device may be arranged to detect a position, e.g. an orientation, of the lever, e.g. relative to the support body. The sensing device may include one or more switches, detectors, sensors, and/or other means for detecting the lever. The sensing device may be arranged to detect multiple distinct positions of the lever, e.g. relative to the support body, each distinct position corresponding to a different actuation position. For example, in addition to the first actuation position, the lever may be movable to a further actuation position, different from the first actuation position, wherein the lever also actuates the sensing device in the further actuation position.

The sensing device is particularly arranged to detect the position of the lever 3, relative to the support body 2, in the second direction. The lever may actuate the sensing device, when the lever is at a particular, e.g. predefined position. In this case, the lever actuates the sensing device at least when the lever 3 is at its first actuation position. Further actuation positions may be present. The control device 1 may for example include two distinct actuation positions, a first actuation position and a second actuation position.

The sensing device may comprise one more, e.g. electronic, switches, sensors or detectors. Actuation of the sensing device may accordingly involve actuating one or more of the switches of the sensing device. Actuation for instance involves opening and/or closing of an electric circuit.

Figures 2A, 2B, 2C:
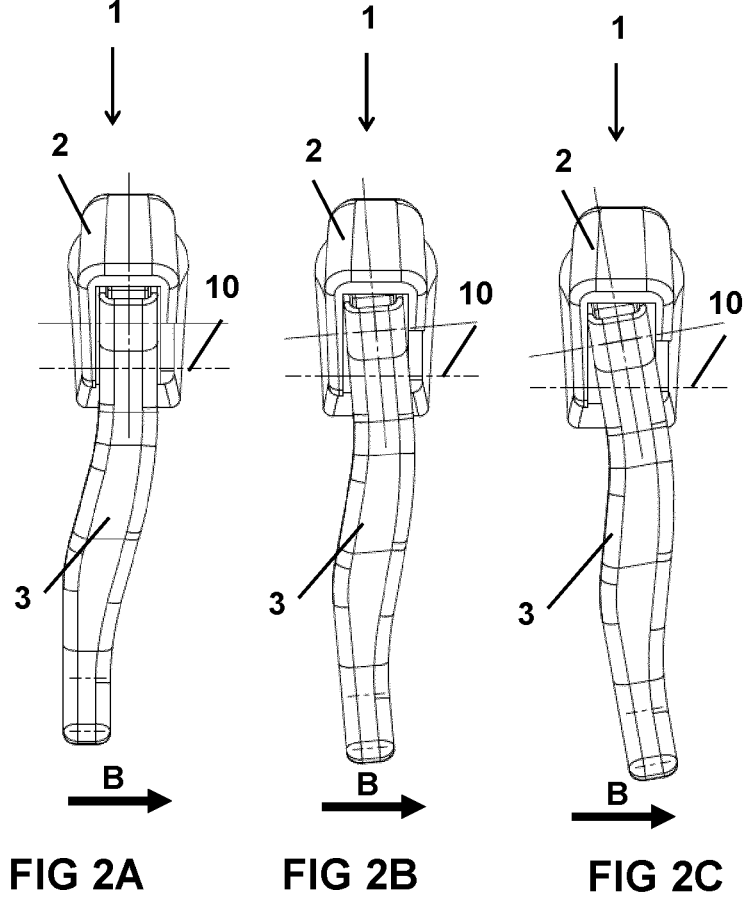
FIGS. 2A-2C show an example of a control device.

FIGS. 2A-2C show frontal views of the control device 1, in three respective states. In FIG. 2A, the lever 3 is in its neutral position, relative to the support body. In this case, the neutral position corresponds to lever pointing downward in use. FIG. 2B shows the lever 3 being in the first actuation position. FIG. 2C shows the lever 3 being in the second actuation position. It will be appreciated that a third actuation position may be present, e.g. beyond the second actuation position.

The first and second actuation positions are reachable by the lever, by moving the lever in the second direction. In particular, the first actuation position is reachable by the lever, by moving the lever by a first amount, and the second actuation position is reachable by the lever 3 by moving the lever 3 by a second amount. Here the first amount and the second amount are defined from the neutral position. The first amount and the second amount are different. The second amount is in particular larger than the first amount. The lever 3 can thus be moved from its neutral position to the second actuation position, via the first actuation position. Similarly, when returning the lever 3 from the second actuation position to its neutral position, e.g. using the return spring 6, after release of the lever 3, the lever 3 moves through the first actuation position. In this example, the second actuation position is positioned beyond the first actuation position when seen from the neutral position. It will be appreciated that it is also possible that the second actuation position is positioned on the opposite side of the neutral position relative to the first actuation position, e.g. to the left of the neutral position in the example of FIGS. 2A-2C.

The respective actuation positions in this example correspond to a predefined pivot amplitude of the lever 3 in the second direction relative to the support body 2. The sensing device may for example comprise a angular sensor for measuring a rotation magnitude of the lever about the second pivot axis relative to the support body 2. The different actuation positions of the lever may be made noticeable for the cyclist for example by means of local resistance increases or decreases along the pivot path of the lever. This can be done with a further biasing member.

Figure 3:
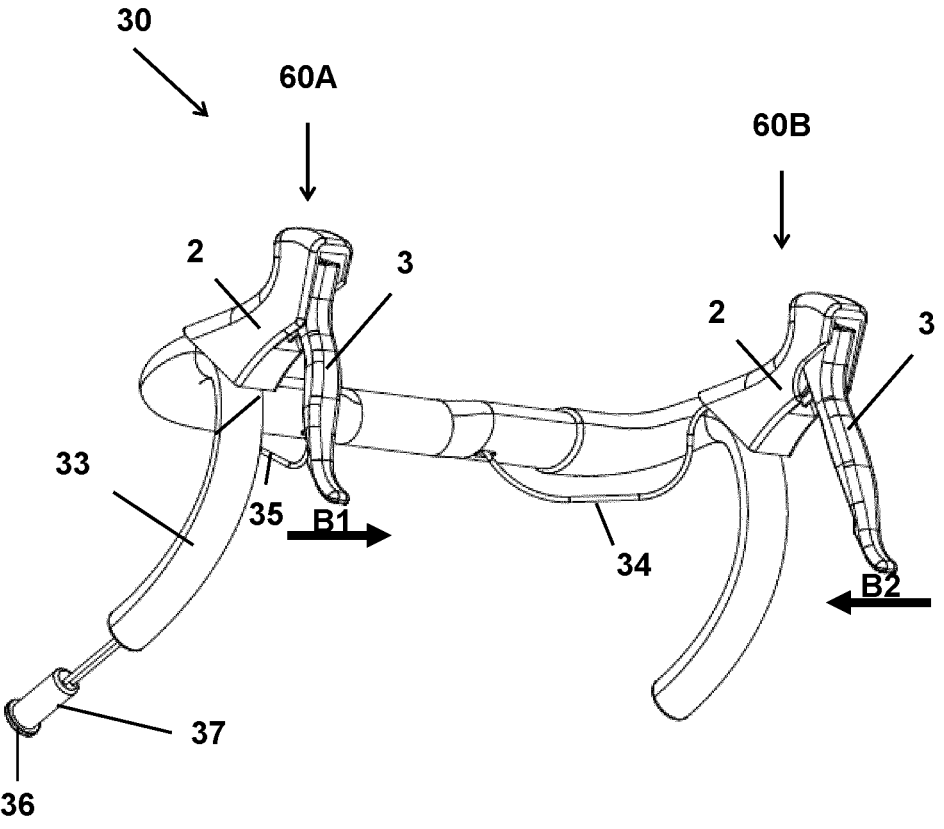
FIG. 3 shows an example of an assembly.

FIG. 3 shows a perspective view of an assembly 30, comprising a handlebar 33 of a bicycle, in this case drop handlebar of a road or gravel race bicycle. A first and a second control device 1 are mounted to the handlebar 33, at a respective right and left grip portion of the handlebar 33, when used by the cyclist. The first and second control device 60A, 60B are substantially mirrored with respect to one another. In this example, the direction of movement of the lever in the second direction of the first control device 60A, indicated by arrow B1 is opposite the direction of movement of the lever in the second direction of the second control device 60B, indicated by arrow B2.

A controller 37 is provided, in this example in an end section of the handlebar 33. Here, each sensing device, i.e. the sensing device of the first control device 60A, and the sensing device of the second control device 60B, is connected to the controller by means of a respective wire 34, 35. Said connection may alternatively be wirelessly. Here, the wires 34, 35 at least partly run through a cavity of the handlebar 33. The controller 37 comprises a transmitter 36, which transmitter 36 is arranged to transmit a wireless signal. The transmitter 36 is particularly arranged to transmit a wireless signal to an actuator of a transmission system to activate a transmission ratio shift.

Figure 4A:
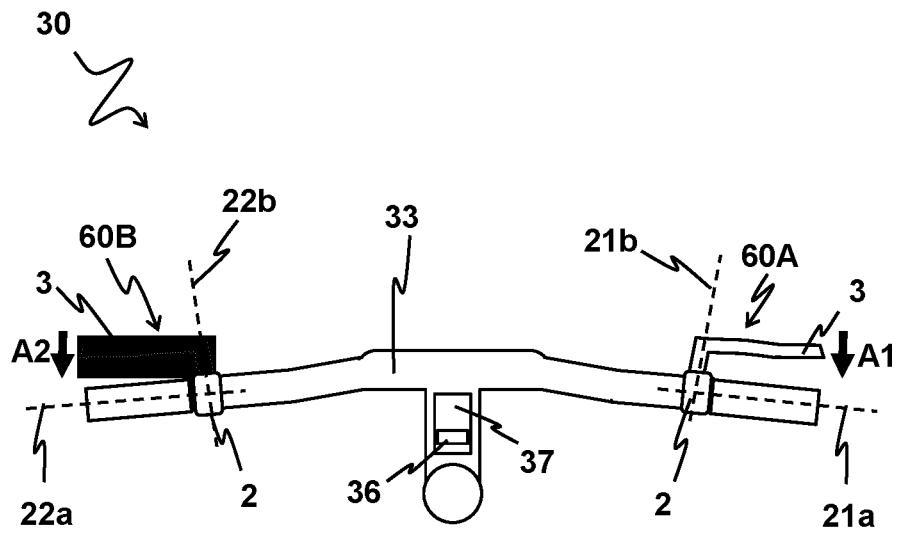
FIGS. 4A-4B show exemplary assemblies
Figure 4B:
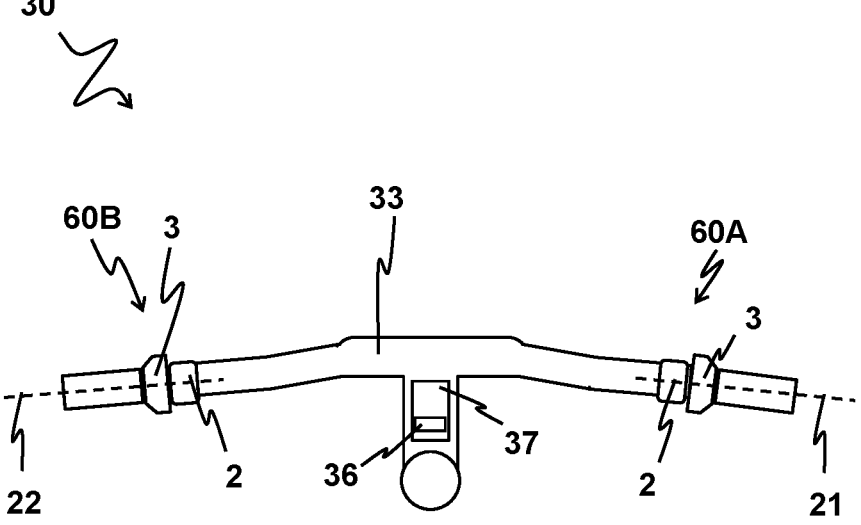

FIGS. 4A and 4B show further examples of an assembly 30 comprising a handlebar 33 of a bicycle, in this case a flat-bar handlebar of a mountain bike or commuter bike. A first and a second control device 60A, 60B are mounted to the handlebar 33, at a respective right and left grip portion of the handlebar 33. FIG. 4A shows an example wherein the manipulation organ 3 is embodied as a lever, which lever is movable in a brake direction indicated by respective arrows A1 and A2, for activating a brake of the bicycle. The lever is in this example further movable in an actuation direction, different from the brake direction, to execute a control program. The actuation direction of the lever 3 in this example corresponds to a pivot direction about the respective pivot axis 21a or 21b and 22a or 22b. A user can move the lever 3 upward and/or downward with its fingers, so as to pivot the lever about its respective pivot axis 21a, 21b, 22a, 22b to actuate a desired control program. The lever 3 may be biased in a neutral position, e.g. with a spring, such that the lever 3 returns automatically returns to the neutral position after having been moved to an actuation position.

FIG. 4B shows an example wherein the manipulation organ 3 is embodied as a rotary switch, which is movable relative to the support body 2 about a respective rotation axis 21, 22. The rotary switch 3 may be bidirectionally rotatable about its respective rotation axis, or unidirectionally. The rotary switch can be movable relative to the support body to a first actuation position (e.g. forward rotation) for transmitting a first signal, and to a second actuation position (e.g. rearward rotation) for transmitting a second signal, different from the first signal. However, more than two actuation positions and associated signals are contemplated. The rotary switch may be an endless rotary switch, having no rotation end points. The endless rotary switch, either unidirectional or bidirectional, may hence be rotated infinitely. The rotary switch may alternatively be rotatable between end points, e.g. with or without a return to neutral. Further, the actuation positions of the manipulation organ may be indexed, wherein each indexed position is associated with an actuation position, or non-indexed. For a bidirectional rotary switch, one rotation direction may be reserved for activating brakes of the bicycle. The brakes may be activated by a dedicated control program, stored in memory of the controller 37, or by a separate brake channel. The other, opposite, rotation direction may be reserved for activating a (different) control program, such as a gear shift control program. The brake action may be regenerative, wherein deceleration energy is harvested and stored in a battery, for example for powering the control device. It will be appreciated that instead of, or together with, a rotary switch also different manipulation organs such as buttons, toggles, or the like can be used. It will be appreciated that each control device can include more than one manipulation organ for generating the two or more signals.

FIG. 5 shows a schematic representation of a transmission system 40 for a bicycle. The transmission system 40 comprises a system transmission 50 including a first transmission 51 and a second transmission 52. The first transmission 51 is operable according to at least a first transmission ratio and a second transmission ratio. The second transmission 52 is also operable according to at least a first transmission ratio and a second transmission ratio. The first transmission ratios of the first transmission 51 need not be identical or overlapping with the transmission ratios of the second transmission 52. The system transmission has an input 55 couplable to the first transmission 51, and an output 56 couplable to the second transmission 52. The first and second transmissions 51,52 are couplable to one another, e.g. my means of an axle, shaft, chain, belt, brake or clutch device.

The first transmission 51 includes a first actuator for switching between the first and second transmission ratios of the first transmission 51. Similarly, the second transmission 52 includes a second actuator for switching between the first and second transmission ratios of the second transmission 52. The combination of transmission ratios of the first transmission 51 and the second transmission 52 determine the system transmission ratio between the input 55 and the output 56.

The first transmission 51 may for example correspond to the front chainrings of a bicycle, wherein the front derailleur corresponds to the first actuator. The second transmission 52 may for example correspond to the rear cassette of sprocket of the bicycle, wherein the rear derailleur corresponds to the second actuator.

Each actuator of the first and second transmissions 51, 52 is connected to the controller 37, in this case wirelessly. The controller 37 is also connected, e.g. wiredly, to a first control device 60A and the second control device 60B. Each control device 60A, 60B has a sensing device that includes for example two switches 61A,61B and 62A,62B. Each sensing device can also include any type of electric sensor, and can also have only one sensor. For example the first switch 61A of the first control device is actuated when the manipulation organ, e.g. lever, of the first control device 60A is in its first actuation position. A second switch 62A of the first control device 60A is actuated when the manipulation organ, e.g. lever, of the first control device 60A is in its second actuation position. Similarly, a first switch 61B of the second control device 60B is actuated when the manipulation organ, e.g. lever, of the second control device 60B is in its first actuation position. A second switch 62B of the second control device 60B is actuated when the manipulation organ, e.g. lever, of the second control device 60B is in its second actuation position. The sensing device may also include other buttons or switches, that are operable by the cyclist in addition to the lever.

Each control device 60A, 60B is arranged to transmit a signal, here a shift signal, to the controller 37. The controller 37 includes a processor for processing the received signals, and execute an appropriate control program, which control program may be stored in a memory of the controller. Depending on the received signal and/or combination of signals and/or duration of the signal and/or sequence of the signals and/or absence of the signal, the controller 37 is arranged to execute an associated control program, that controls the first and/or second actuator 51, 52.

The controller 37 may be arranged to control the shift actuators 51, 52 of the transmission system 50 in dependence of the received signals from one or both of the control devices 60A,60B. For example to an upshift or downshift command provided by the cyclist. For example, the user may wish to command a gearshift to a higher transmission ratio. He/she can do so, for example, by moving the manipulation organ, e.g. lever, of the first control device 60A to its first actuation position. The sensing device of the first control device 60A accordingly transmits a signal, to the controller. The controller 37 may receive a signal from the first switch 61A of the first control device 60A. The controller 37 subsequently controls the shift actuators accordingly, i.e. in such a way that a higher transmission ratio is achieved. This may involve activating the first shift actuator 51 to change its transmission ratio, and also activating the second actuator 52 to change its transmission ratio, such that the system transmission ratio is increased as commanded by the user.

The first control device 60A may be dedicated for upshifting, and the second control device 60B may be dedicated for down shifting, or vice versa.

The first actuation position, here associated with the first switches 61A,61B, may be dedicated for a shifting to the first next higher transmission ratio. The second actuation position, here associated with the second switches 62A,62B, may be dedicated for a shifting to the second, third, fourth, fifth or sixth next higher transmission ratio, also known as a bail out.

Depending on the transmission ratio used at that point in time, the next higher transmission ratio can be obtained by actuating one or more of the shift actuators 51,52. The controller 37 may thus be configured to select and actuate the appropriate shift actuator. The user thus needs to make only one gearshift command, as the controller 37 activates one or more of the shift actuators 51, 52 accordingly.

The example of FIG. 5 relates to controlling shift actuators 51, 52. It will be appreciated that in addition to, or instead of, the shift actuators also different actuators may be controlled by the controller 37 in response to receiving the signal and/or combination of signals and/or duration of the signal and/or sequence of the signals and/or absence of the signals. Hence, the controller may also execute different control programs. In general, the control system may comprise the first control device 60A and the second control device 60B. The first control device 60A can be arranged to transmit a first signal when actuated according to a first mode and to transmit a second signal, different from the first signal, when actuated according to a second mode. The second control device 60B can be arranged to transmit a third signal when actuated according to a first mode and to transmit a forth signal, different from the third signal, when actuated according to a second mode. The controller 37 is operatively connected to the first and second control devices and contains one or more control programs that are executable upon receiving of one or more of the first, second, third and fourth signals. The first control device 60A can comprise a support body for being fixed to or integrated with a handlebar of the bicycle and a manipulation organ arranged to be selectively brought into a first actuation position or a second actuation position. The first control device can be arranged to transmit the first signal when the manipulation organ actuated is in, reaches or leaves the first actuation position and to transmit the second signal when the manipulation organ actuated is in, reaches or leaves the second actuation position. The second control device 60B can comprise a support body for being fixed to or integrated with a handlebar of the bicycle and a manipulation organ arranged to be selectively brought into a first actuation position or a second actuation position. The second control device can be arranged to transmit the third signal when the manipulation organ actuated is in, reaches or leaves the first actuation position and to transmit the fourth signal when the manipulation organ actuated is in, reaches or leaves the second actuation position. The first control device 60A and/or the second control device 60B can be a control device as described herein, e.g. in view of any of FIGS. 1-5. FIG. 6 shows a schematic example of different control programs a controller can contain and execute, in dependence of a relative position of the respective manipulation organ, e.g. lever, of first and second control devices. With a control system that includes two control devices, wherein each control device has a single manipulation organ, here a single lever, that is movable between three distinct positions, e.g. a first actuation position, a second actuation position and a neutral position, nine different combinations of relative lever positions are possible. Each of those nine different combinations may be associated to a respective control program. It will be appreciated that e.g. time-dependent actuation and repetitive actuation of the sensing devices could enable additional functionality. It will also be appreciated that this schematic can be extended or reduced to control devices with manipulation organs, e.g. levers, that have more than three or less than 3 relative positions. The control programs may for example be used for various operations including transmission upshift, transmission downshift, transmission double upshift, transmission double downshift, increasing electric motor output, decreasing electric motor output, increasing electric motor support, decreasing electric motor support, increasing suspension stiffness, decreasing suspension stiffness, increasing seat post length, decreasing seat post length, switch on lights, switch off lights, taking a photograph, etc.

Figure 7:
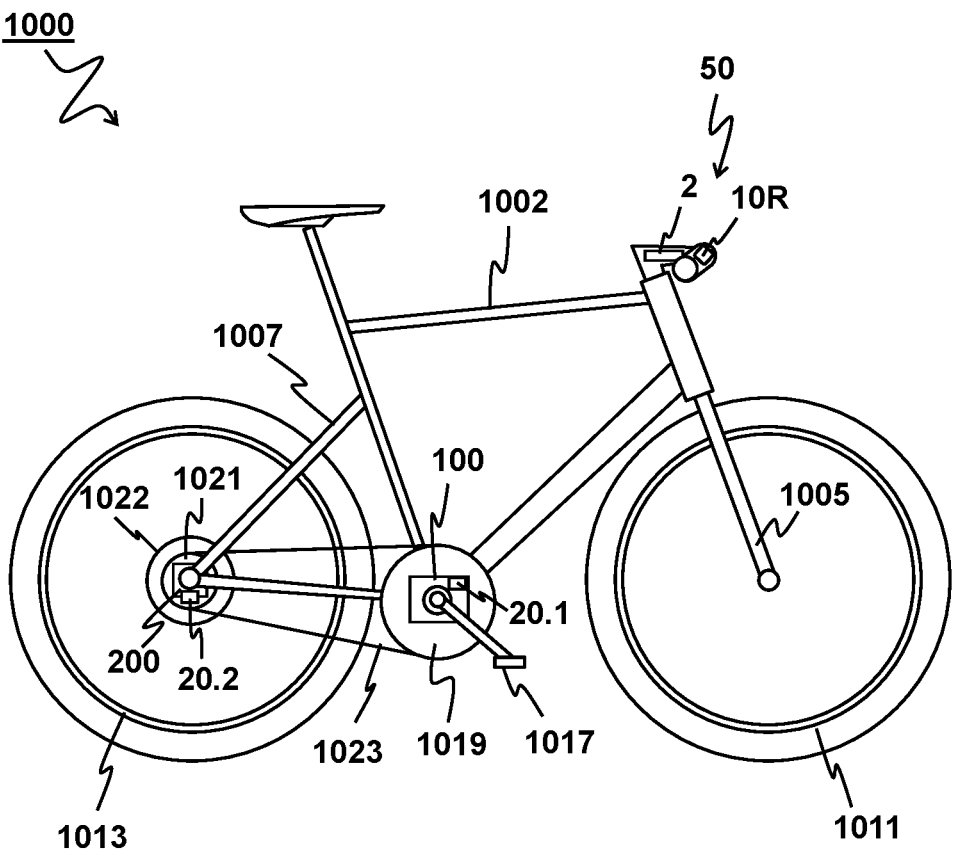
FIG. 7 shows a bicycle.

FIG. 7 shows a bicycle 1000. The bicycle 1000 comprises a frame 1002 with a front fork 1005 and a rear fork 1007, as well as a front wheel and a rear wheel 1011, 1013 located in the front and rear fork respectively. The bicycle 1000 further comprises a crank 1017, and a front chain wheel 1019. The bicycle 1000 also comprises a rear sprocket 1021 and a rear wheel hub 1022 of the rear wheel 1013, wherein a chain or belt 1023 threads over the front chain wheel 1019 and rear sprocket 1021. In this example, the bicycle 1000 comprises a first transmission 51, which is interconnected between the crank 1017 and front chain wheel 1019, and a second transmission 52 which is interconnected between the rear sprocket 1021 and the rear wheel hub 1022. The first transmission 51 is operable according to multiple transmission ratios and includes a first gearshift actuator for actuating a gear shift with the first transmission 51. The second transmission 52 is also operable according to multiple transmission ratios and includes a second gearshift actuator for actuating a gear shift with the second transmission 52.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A control system for a bicycle, comprising:
   a first control device for the bicycle arranged to transmit a first signal when actuated according to a first mode and to transmit a second signal, different from the first signal, when actuated according to a second mode;
   a second control device for the bicycle arranged to transmit a third signal when actuated according to a first mode and to transmit a fourth signal, different from the third signal, when actuated according to a second mode; and
   a controller operatively connected to the first and second control devices, the controller containing one or more control programs that are executable upon receiving of one or more of the first, second, third and fourth signals,
   wherein the controller is configured to execute a first control program upon receiving the first signal from the first control device, to execute a third control program upon receiving the third signal from the second control device, and to execute a fifth control program upon receiving the first signal from the first control device and the third signal from the second control device.

2. The control system of claim 1, wherein the first control device and/or second control device comprise a sensing device.

3. The control system according to claim 2, wherein the sensing device is arranged to transmit at least four distinctive signals to the controller, each signal of the at least four distinctive signals corresponding to a respective position of a manipulation organ of the first control device relative to a manipulation organ of the second control device.

4. The control system according to claim 3, wherein a transmission of the at least four distinctive signals are independently triggerable by means of said manipulation organs.

5. The control system of claim 1, wherein the first control device comprises a support body arranged for being fixed to or integrated with a handlebar of the bicycle and a manipulation organ arranged to be selectively brought into a first actuation position or a second actuation position, wherein the first control device is arranged to transmit the first signal when the manipulation organ actuated is in, reaches or leaves the first actuation position and to transmit the second signal when the manipulation organ actuated is in, reaches or leaves the second actuation position; and/or wherein the second control device comprises a support body arranged for being fixed to or integrated with a handlebar of the bicycle and a manipulation organ arranged to be selectively brought into a first actuation position or a second actuation position, wherein the second control device can be arranged to transmit the third signal when the manipulation organ actuated is in, reaches or leaves the first actuation position and to transmit the fourth signal when the manipulation organ actuated is in, reaches or leaves the second actuation position.

6. The control system according to claim 1, wherein the first control device is arranged to be operable with a user's right hand and the second control device is arranged to be operable with the user's left hand, or vice versa.

7. A control device for a bicycle, comprising:

a support body for being fixed to or integrated with a handlebar of the bicycle, a manipulation organ movably arranged relative to the support body for being manually operable by a user, a sensing device arranged to transmit a signal upon actuation thereof by the manipulation organ, and a controller operatively connected to the sensing device, the controller containing one or more control programs that are executable by actuation of the sensing device, wherein the sensing device is configured to transmit a first signal when actuated according to a first mode and to transmit a second signal, different from the first signal, when actuated according to a second mode, wherein the controller is configured to execute a first control program in response to the first signal, and execute a second control program in response to the second signal, wherein the first control program activates a gearshift to a next higher or lower transmission ratio, and the second control program activates the gearshift with a larger step size than the first control program.

8. The control device according to claim 7, wherein the manipulation organ is movable relative to the support body to a first actuation position and to a second actuation position.

9. The control device according to claim 8, wherein the manipulation organ is biased towards a neutral position, and from the neutral position is movable to the first and second actuation positions.

10. The control device according to claim 8, wherein a transmission of the second signal is triggerable by holding the manipulation organ in the first or second actuation position for a predefined period of time.

11. The control device according to claim 8, wherein the sensing device is configured to transmit the first signal when the manipulation organ is at the first actuation position or moves to or away from the first actuation position, and to transmit the second signal when the manipulation organ is at the second actuation position or moves to or away from the second actuation position.

12. The control device according to claim 8, wherein the manipulation organ is movable to the first actuation position by a moving the manipulation organ in an actuation direction by a first amount, and wherein the manipulation organ is movable to the second actuation position by a moving the manipulation organ in the actuation direction by a second amount different from the first amount.

13. The control device according to claim 8, wherein the sensing device comprises a first switch, and a second switch, and wherein the control device is arranged to actuate the first switch when the manipulation organ is at the first actuation position, and to actuate the second switch when the manipulation organ is at the second actuation position.

14. The control device according to claim 7, wherein the controller comprises or is connected to a transmitter arranged for transmitting a wireless control signal.

15. The control device according to claim 7, wherein the controller comprises or is connected to a receiver arranged for receiving sensor signals, wherein the controller contains one or more control programs that are executable upon receiving the sensor signals.

16. The control device according to claim 7, wherein one or more of the control programs is customizable.

17. The control device according to claim 7, wherein the controller contains a control program for activating a gearshift of a bicycle transmission system.

18. The control device of claim 17, wherein, the controller is configured to activate a first transmission ratio change upon a first actuation duration of the sensing device, and a second transmission ratio change upon a second actuation duration of the sensing device, wherein the first actuation duration is shorter than the second actuation duration, and the first transmission ratio change is smaller than the second transmission ratio change.

19. The control device according to claim 7, wherein the controller is arranged to execute the first control program when the manipulation organ is at a first actuation position or moves to or away from the first actuation position, and execute the second control program when the manipulation organ is at a second actuation position or moves to or away from the second actuation position.

20. The control device according to claim 19, wherein the first control program activates a gearshift to a first next higher or lower transmission ratio, and the second control program activates the gearshift to a second, third, fourth, fifth or sixth next higher or lower transmission ratio, or vice versa.

21. The control device according to claim 7, wherein the manipulation organ includes a lever and/or ring shaped body.

22. The control device of claim 7, wherein the controller is configured to select a control program of a plurality of control programs upon time-dependent actuation or repetitive actuation of the sensing device.

\* \* \* \* \*